(12) United States Patent
Lee et al.

(10) Patent No.: US 9,304,242 B2
(45) Date of Patent: Apr. 5, 2016

(54) DISPLAY DEVICE

(71) Applicants: Wu-Hsieh Lee, Hsin-Chu (TW);
Hung-Sen Lin, Hsin-Chu (TW);
Chao-Chung Tsen, Hsin-Chu (TW);
Wei-Kai Liao, Hsin-Chu (TW);
Chi-Lun Chen, Hsin-Chu (TW)

(72) Inventors: Wu-Hsieh Lee, Hsin-Chu (TW);
Hung-Sen Lin, Hsin-Chu (TW);
Chao-Chung Tsen, Hsin-Chu (TW);
Wei-Kai Liao, Hsin-Chu (TW);
Chi-Lun Chen, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 126 days.

(21) Appl. No.: 13/949,225

(22) Filed: Jul. 24, 2013

(65) Prior Publication Data
US 2015/0029752 A1  Jan. 29, 2015

(51) Int. Cl.
*F21V 7/04* (2006.01)
*F21V 8/00* (2006.01)

(52) U.S. Cl.
CPC ............ *G02B 6/0016* (2013.01); *G02B 6/002* (2013.01); *G02B 6/0031* (2013.01)

(58) Field of Classification Search
CPC .. G02B 6/0023; G02B 6/0028; G02B 6/0036; G02B 6/0081
USPC ............... 362/621, 628, 632–634; 349/58–60
See application file for complete search history.

(56) References Cited

U.S. PATENT DOCUMENTS

| 5,997,148 A * | 12/1999 | Ohkawa | 362/619 |
| 2010/0103345 A1 | 4/2010 | Kuo et al. | |
| 2012/0257137 A1 * | 10/2012 | Nitanai | 349/58 |

FOREIGN PATENT DOCUMENTS

| CN | 102121622 | 7/2011 |
| TW | M284913 | 1/2006 |
| TW | 200702596 | 1/2007 |
| TW | 200942743 | 10/2009 |
| TW | 201017291 | 5/2010 |
| TW | I331666 | 10/2010 |

OTHER PUBLICATIONS

"Office Action of China Counterpart Application", issued on Mar. 30, 2015, p. 1-p. 8.

* cited by examiner

*Primary Examiner* — Jason Moon Han
(74) *Attorney, Agent, or Firm* — Jianq Chyun IP Office

(57) ABSTRACT

A display device includes a light guide plate, at least one illuminating element, a side frame, and a display panel. The light guide plate includes a main body and at least one light-incident protrusion part. The main body has a light-emitting surface. The light-incident protrusion part is connected to the main body and has a light-incident surface. The illuminating element is arranged along the light-incident surface and is capable of emitting a light beam. The light beam enters the light guide plate from the light-incident surface and leaves the light guide plate from the light-emitting surface. The side frame is located on the light guide plate. The display panel is located between the light guide plate and the side frame. The side frame and the display panel expose the light-incident protrusion part. The side frame of the display device described herein has the small width.

27 Claims, 16 Drawing Sheets

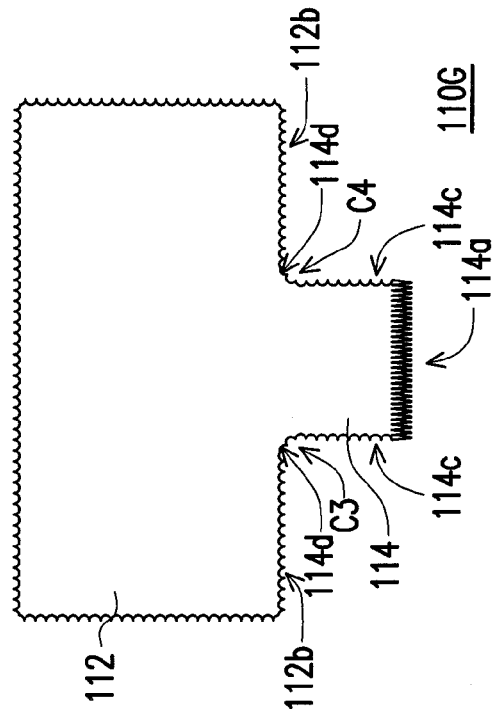
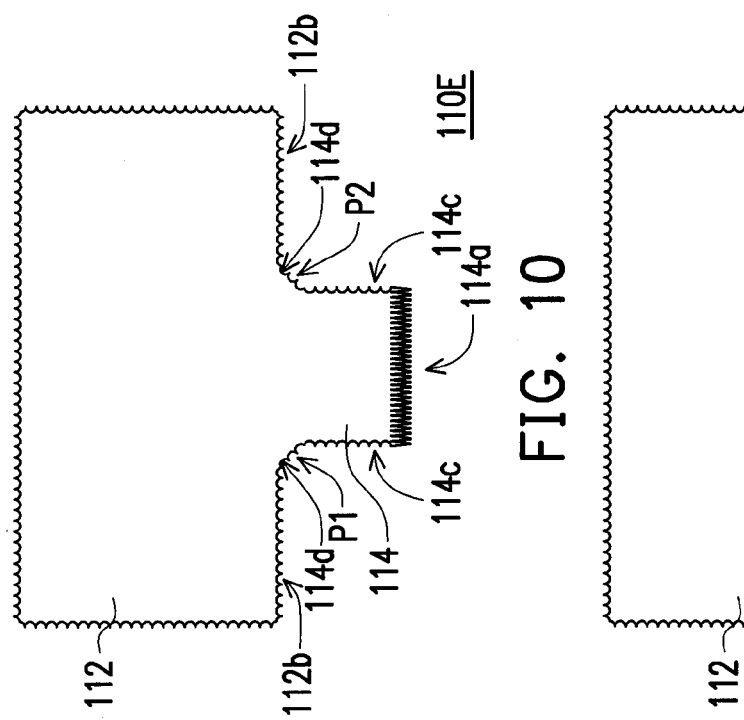
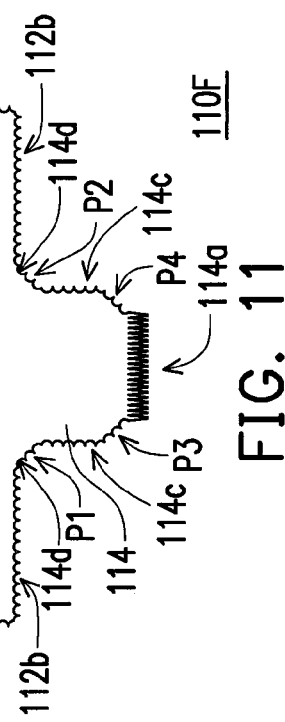
FIG. 10
FIG. 11
FIG. 12

DISPLAY DEVICE

BACKGROUND OF THE INVENTION

1. Field of the Invention

The invention relates to a display device. More particularly, the invention relates to a display device that includes a light guide plate (LGP).

2. Description of Related Art

A conventional display device includes a light guide plate (LGP), a plurality of illuminating elements located at one side of the LGP, a display pane located on the LGP, a side frame, and a rear plate. The display panel and the LGP are sandwiched in between the side frame and the rear plate. According to the related art, the LGP around the illuminating elements is apt to encounter an issue of uneven light distribution. Hence, in the conventional display device, areas subject to uneven light distribution are covered by the side frame. This however lessens the likelihood of narrowing down the side frame. The conventional display device may further include two driving circuit boards respectively for driving the display panel and the illuminating elements. The driving circuit boards are often arranged behind the rear plate, thus leading to the difficulty in reduction of the width of the entire display device.

In Taiwan Patent no. M284913, a backlight module is disclosed. The backlight module includes a LGP, and bumps are arranged at a side of the LGP. In Taiwan Patent no. 1331666, a LGP is disclosed. Plural optical microstructures are located on the bar-shaped side surface of the LGP. In Taiwan Patent Publication no. 201017291, another LGP is disclosed. A plurality of optical microstructures is located at sides of the LGP, and these optical microstructures may have a plurality of arc surfaces. In China Patent no. CN102121622A, a direct-type backlight module is disclosed. The backlight module includes a LGP, a plurality of light sources, and an optical adhesive.

SUMMARY OF THE INVENTION

The invention provides a display device whose side frame has a small width.

Additional purposes and/or advantages of the invention will be disclosed in part in the description which follows and, in part, will be obvious from the description, or may be learned by the technical features of the invention.

In order to encompass at least one of the purposes or other purposes, an embodiment of the invention provides a display device that includes a light guide plate (LGP), at least one illuminating element, a side frame, and a display panel. The LGP includes a main body and at least one light-incident protrusion part. The main body has a light-emitting surface. The light-incident protrusion part is connected to the main body and has a light-incident surface. The illuminating element is arranged along the light-incident surface and is capable of emitting a light beam. The light beam enters the LGP from the light-incident surface and leaves the LGP from the light-emitting surface. The side frame is located on the LGP. The display panel is located between the LGP and the side frame. The side frame and the display panel expose the light-incident protrusion part.

In view of the above, the display device described in the embodiments of the invention may have at least one of the following advantages or effects. According to an embodiment of the invention, the light beam emitted from the illuminating element may undergo a light-mixing process within the light-incident protrusion part outside the side frame, and thus the side frame need not cover the light-mixing area (where the light-incident protrusion part is located) that is apt to encounter the issue of uneven light distribution. Thereby, the width of the side frame may be reduced, and thus the display device described herein may be equipped with the side frame having the small width.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention particularly.

FIG. 10 illustrates a LGP according to another embodiment of the invention.

FIG. 11 illustrates a LGP according to still another embodiment of the invention.

FIG. 12 illustrates a LGP according to still another embodiment of the invention.

DESCRIPTIONS OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
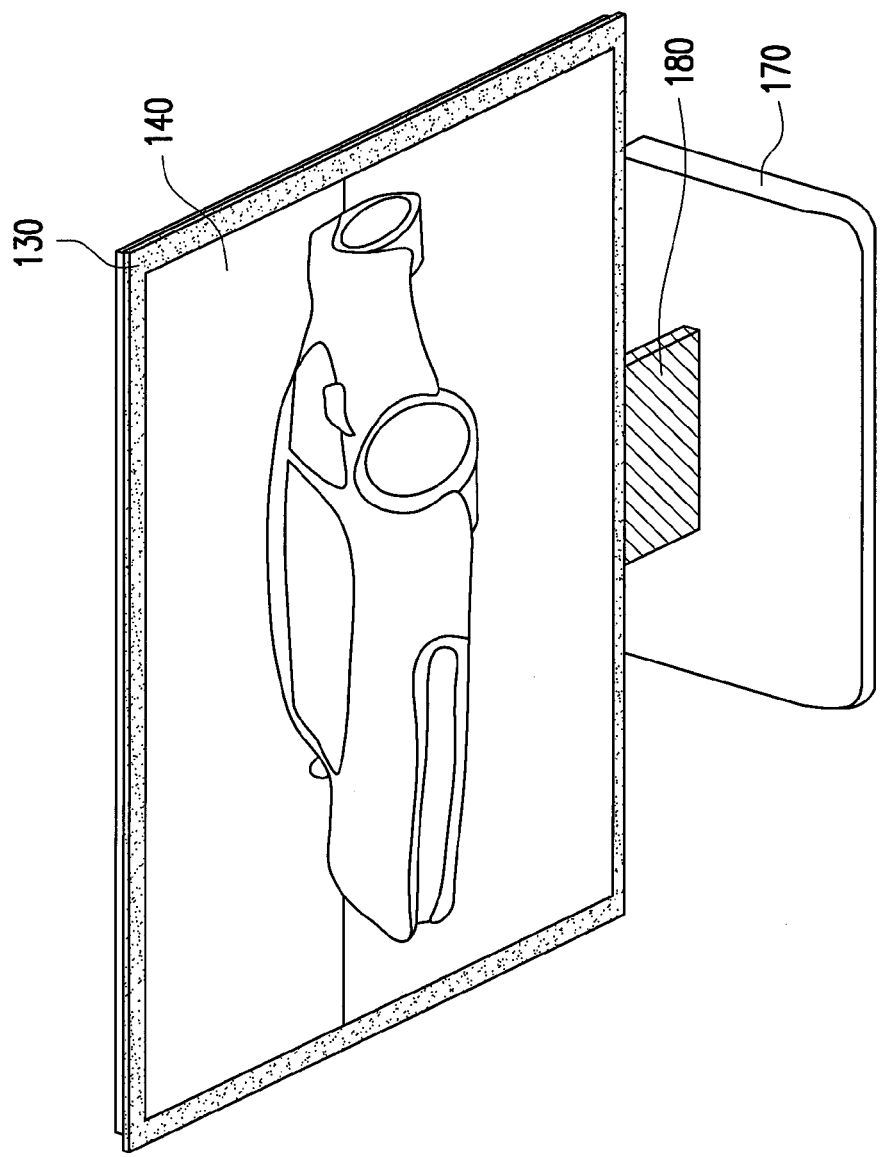
FIG. 1 is a schematic three-dimensional view of a display device according to a first embodiment of the invention.
Figure 3:
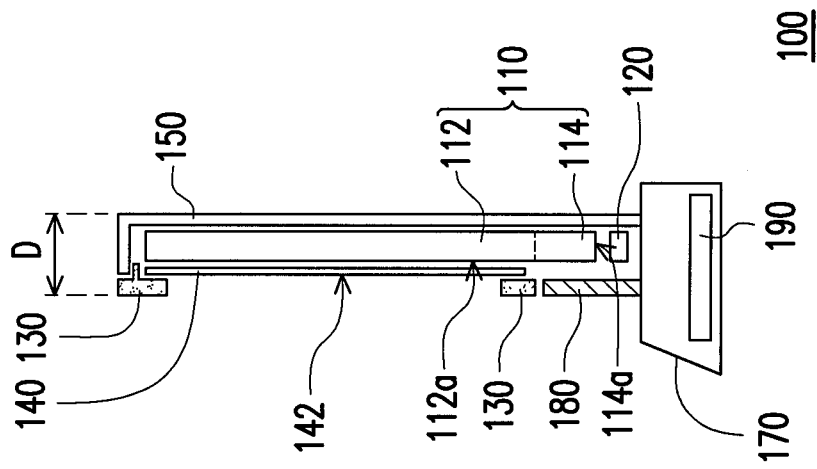
FIG. 3 is a cross-sectional view taken along a section line A-A' shown in FIG. 2.
Figure 2:
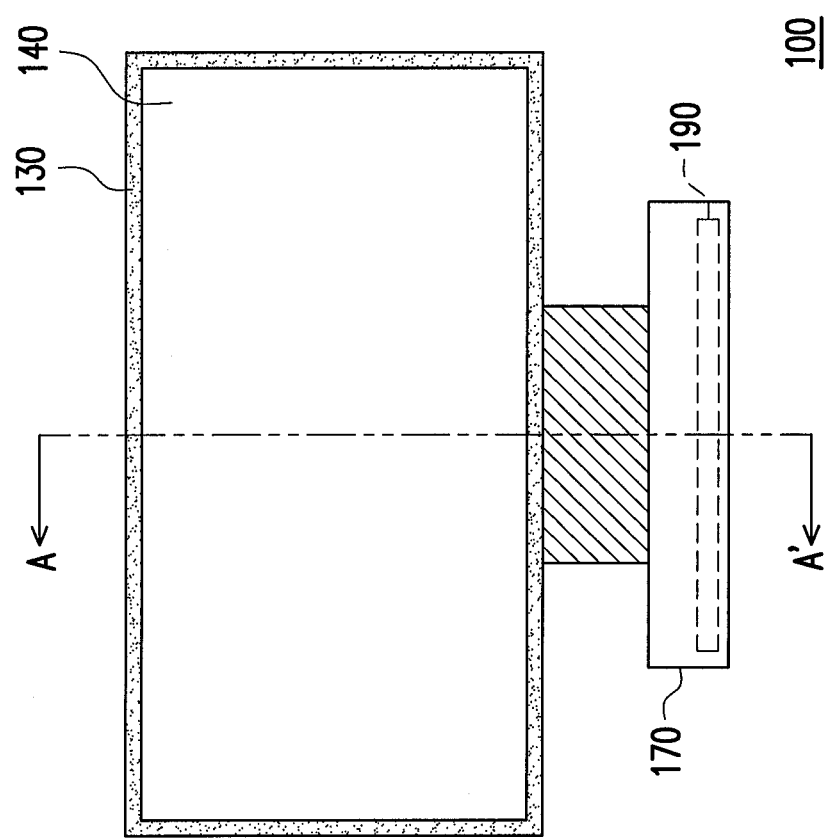
FIG. 2 is a front view of the display device shown in FIG. 1.

FIG. 1 is a schematic three-dimensional view of a display device according to a first embodiment of the invention. FIG. 2 is a front view of the display device shown in FIG. 1. FIG. 3 is a cross-sectional view taken along a section line A-A' shown in FIG. 2. With reference to FIG. 1, FIG. 2, and FIG. 3, the display device 100 described herein includes a light guide plate (LGP) 110 (shown in FIG. 3), at least one illuminating element 120 (shown in FIG. 3), a side frame 130, and a display panel 140. In the embodiment, the display panel 140 is, for instance, a non-self illuminating display panel (e.g., a liquid crystal display panel), while the invention is not limited thereto.

Figure 4:
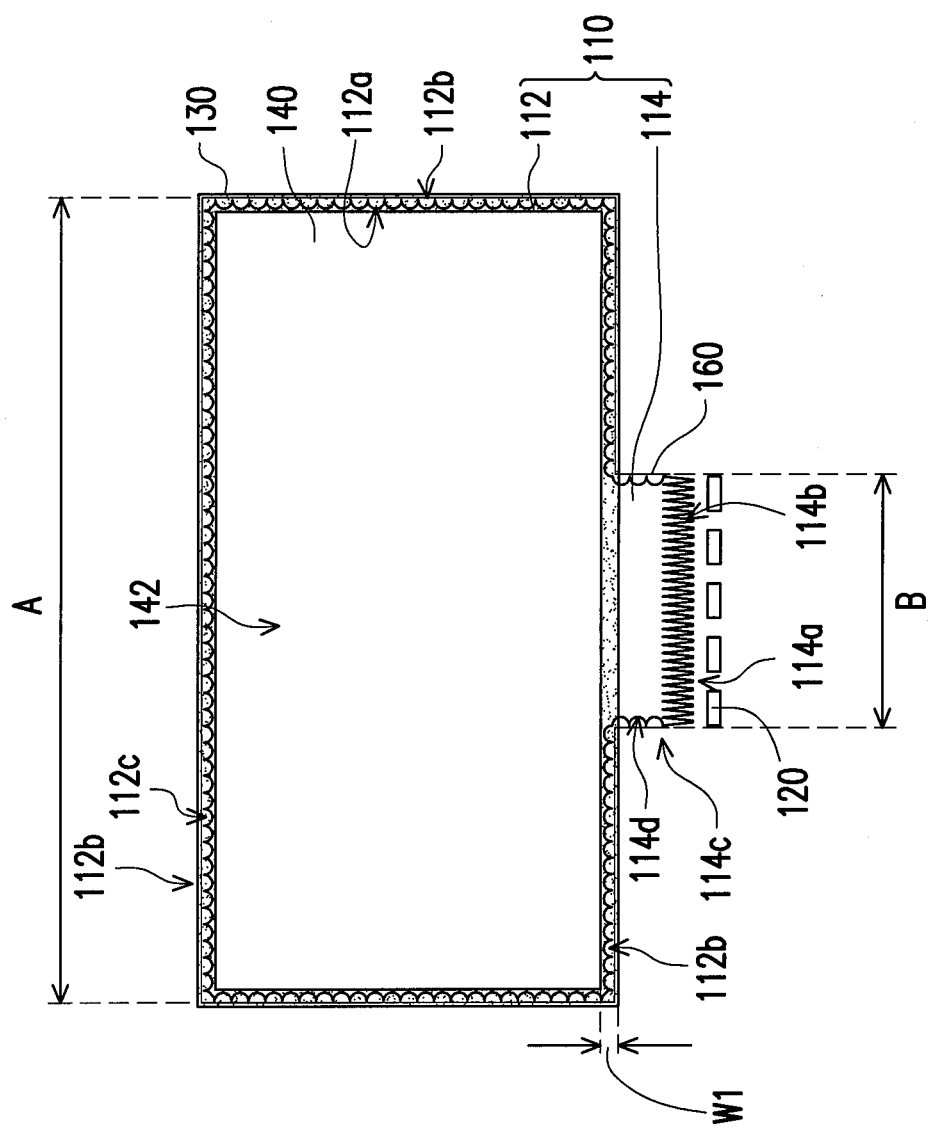
FIG. 4 illustrates the side frame, the display panel, the light guide plate (LGP), and the illuminating element shown in FIG. 2.

FIG. 4 illustrates the side frame, the display panel, the LGP, and the illuminating element shown in FIG. 2. With reference to FIG. 3 and FIG. 4, the LGP 110 described herein includes a main body 112 and at least one light-incident protrusion part 114. The main body 112 has a light-emitting surface 112a. The light-incident protrusion part 114 is connected to the main body 112 and has a light-incident surface 114a. As shown in FIG. 3, in the embodiment, the main body 112 and the light-incident protrusion part 114 are substantially located on the same plane. The illuminating element 120 described herein is arranged along the light-incident surface 114a and is capable of emitting a light beam (not shown). The light beam enters the LGP 110 from the light-incident surface 114a and leaves the LGP 110 from the light-emitting surface 112a. In the embodiment, the illuminating element 120 is a light-emitting diode (LED), for instance. However, the invention is not limited to the above descriptions. In another embodiment of the invention, the illuminating element 120 may also be any other appropriate light source.

As illustrated in FIG. 4, in the embodiment, a width A of the main body 112 of the LGP 110 is greater than a width B of the light-incident protrusion part 114. For instance, the width A of the main body 112 of the LGP 110 and the width B of the light-incident protrusion part 114 satisfy the following equation (1).

$$B \le \frac{4}{5}A \tag{1}$$

With reference to FIG. 3 and FIG. 4, the side frame 130 described herein is located on the LGP 110. The display panel 140 is located between the LGP 110 and the side frame 130. In more detail, the side frame 130 covers the edge of the display panel 140 and partially covers the edge of the LGP 110, while the side frame 130 exposes a display region 142 of the display panel 140. As shown in FIG. 3, the display device 100 described herein may further include a rear plate 150. The display panel 140 and the LGP 110 may be sandwiched in between the side frame 130 and the rear plate 150.

Note that the side frame 130 and the display panel 140 expose the light-incident protrusion part 114 of the LGP 110 in the embodiment. That is, at least one portion of the light-incident protrusion part 114 is located outside the side frame 130. The light beam (not shown) emitted by each illuminating element 120 may be mixed within the light-incident protrusion part 114 outside the side frame 130, and the mixed light beam then enters the main body 112, so as to prevent the light beam entering the main body 112 from being non-uniformly distributed. Since the light beam undergoes the light-mixing process within the light-incident protrusion part 114 outside the side frame 130, the side frame 130 described herein need not cover the light-mixing area (where the light-incident protrusion part 114 is located) that is apt to encounter the issue of uneven light distribution. Thereby, the width W1 (shown in FIG. 4) of the side frame 130 may be reduced, and thus the display device 100 described herein may be equipped with the side frame 130 having the small width.

With reference to FIG. 4, the light-incident surface 114a of the LGP 110 described in this embodiment has a plurality of first optical microstructures 114b. The first optical microstructures 114b serve to scatter the light beam entering the light-incident surface 114a. Namely, the first optical microstructures 114b allow the light beam emitted by the illuminating element 120 to be effectively distributed over the light-incident protrusion part 114. In the embodiment, the first optical microstructures 114b are a plurality of V-shaped grooves connected with each other, for instance, and an extension direction of the V-shaped grooves is perpendicular to the light-emitting surface 112a. Note that the first optical microstructures 114b are not limited to be the V-shaped grooves, any other optical structure that allows the light beam to scatter may serve as the first optical microstructures 114b described in the embodiment.

In the embodiment, the light-incident protrusion part 114 also has a first peripheral surface 114c that connects the light-incident surface 114a and the main body 112. The first peripheral surface 114c may have a plurality of second optical microstructures 114d. The main body 112 described in the embodiment has a second peripheral surface 112b. The second peripheral surface 112b surrounds the light-emitting surface 112a and connects with the light-emitting surface 112a. Here, the second peripheral surface 112b may have a plurality of third optical microstructures 112c. The second optical microstructures 114d and the third optical microstructures 112c respectively act to guide the light beam transmitted to the first peripheral surface 114c and the second peripheral surface 112b back to the inside of the light-incident protrusion part 114 and the inside of the main body 112.

In the embodiment, the shape of the second optical microstructures 114d may be the same as the shape of the third optical microstructures 112c. However, the invention is not limited thereto, and the shape of the second optical microstructures 114d may be different from the shape of the third optical microstructures 112c in another embodiment. In the embodiment, the second optical microstructures 114d (and the third optical microstructures 112c) may be a plurality of arc-shaped grooves connected with each other, and an extension direction of the arc-shaped grooves may be perpendicular to the light-emitting surface 112a. Note that the second optical microstructures 114d (and the third optical microstructures 112c) are not limited to be the arc-shaped grooves, any other optical structure that may guide the light beam back to the inside of the LGP 110 may serve as the second optical microstructures 114d (and the third optical microstructures 112c) described in the embodiment.

Figure 5B:
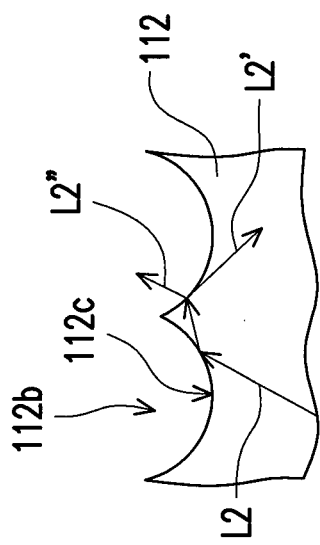
FIG. 5B and FIG. 5C illustrate a partial region provided in FIG. 5A.
Figure 5C:
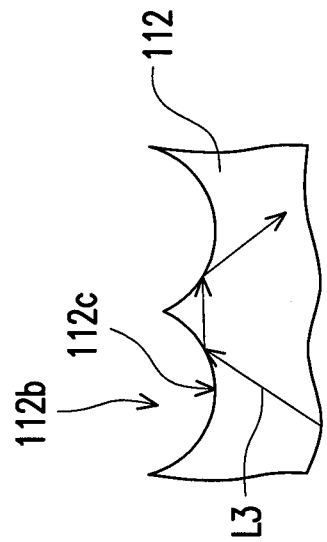
Figure 5A:
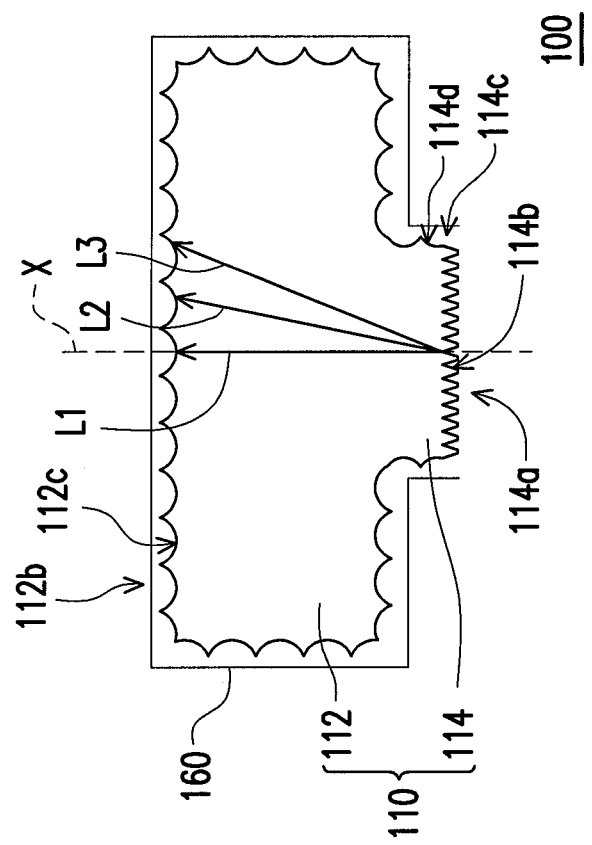
FIG. 5A illustrates the LGP and the reflective sheet shown in FIG. 4.

The mechanism of guiding the light beam back to the inside of the main body 112 by means of the third optical microstructures 112c is elaborated hereinafter with reference to FIG. 5A, FIG. 5B, and FIG. 5C. FIG. 5A illustrates the LGP and the reflective sheet shown in FIG. 4. FIG. 5B and FIG. 5C illustrate a partial region provided in FIG. 5A. As shown in FIG. 5A, the display device 100 described herein may further include a reflective sheet 160. The reflective sheet 160 surrounds the LGP 110. In particular, the reflective sheet 160 may be located around the first peripheral surface 114c and the second peripheral surface 112b and may expose the light-incident surface 114a. An included angle between a light beam L1 and a reference axis X is the smallest included angle; after the light beam L1 is transmitted to the third optical microstructures 112c, the light beam L1 may pass through the third optical microstructures 112c and may be reflected back to the inside of the main body 112. As shown in FIG. 5B, an included angle between a light beam L2 and the reference axis X is the second smallest included angle; after the light beam L2 is transmitted to the third optical microstructure 112c, the light beam L2 may be reflected to another adjacent third optical microstructure 112c, and one portion of the light beam L2' is reflected by the adjacent third optical microstructure 112c back to the inside of the main body 112. The other portion of the light beam L2" passes through the adjacent third optical microstructure 112c and is then reflected by the reflective sheet 160 back to the inside of the main body 112. As shown in FIG. 5C, an included angle between a light beam L3 and the reference axis X is the relatively large included angle; after the light beam L3 is transmitted to the third optical microstructure 112c, the light beam L3 may be reflected to another adjacent third optical microstructure 112c, and may then be reflected by the adjacent third optical microstructure 112 back to the inside of the main body 112. In the embodiment, the functional mechanism of the second optical microstructures 114d may be the same as the functional mechanism of the third optical microstructures 112c and thus will not be further described hereinafter.

With reference to FIG. 4, in the embodiment, the outer profile of the light-incident protrusion part 114 substantially appears to be rectangular, and the light-incident surface 114a may substantially be a plane. However, the shape of the light-incident surface 114a is not limited to that shown in FIG. 4. Based on the actual needs, the shape of the light-incident surface 114a may be properly adjusted, which will be exemplified below with reference to FIG. 6 to FIG. 12.

Figure 6:
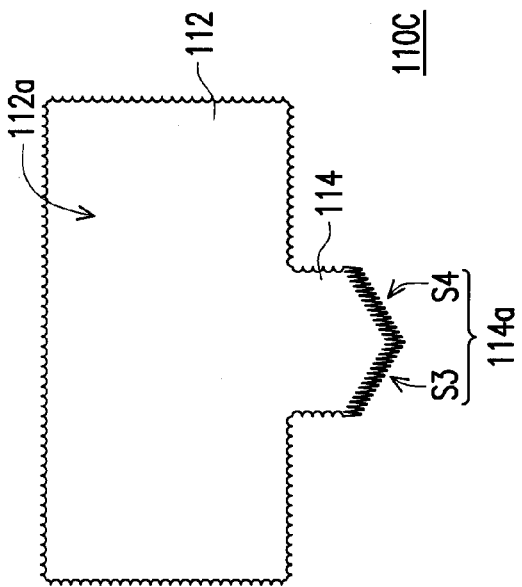
FIG. 6 illustrates a LGP according to another embodiment of the invention.

FIG. 6 illustrates a LGP according to another embodiment of the invention. With reference to FIG. 6, in the LGP 110A, the light-incident surface 114a is concave inward the main body 112. Specifically, the light-incident surface 114a includes a first surface S1 and a second surface S2 directly connected to the first surface S1. The first surface S1 and the second surface S2 are perpendicular to the light-emitting surface 112a. The first surface S1 and the second surface S2 form a recess that is concave inward the main body 112. That is, in the LGP 110A, the light-incident surface 114a may be a V-shaped groove that is concave inward the main body 112.

Figure 7:
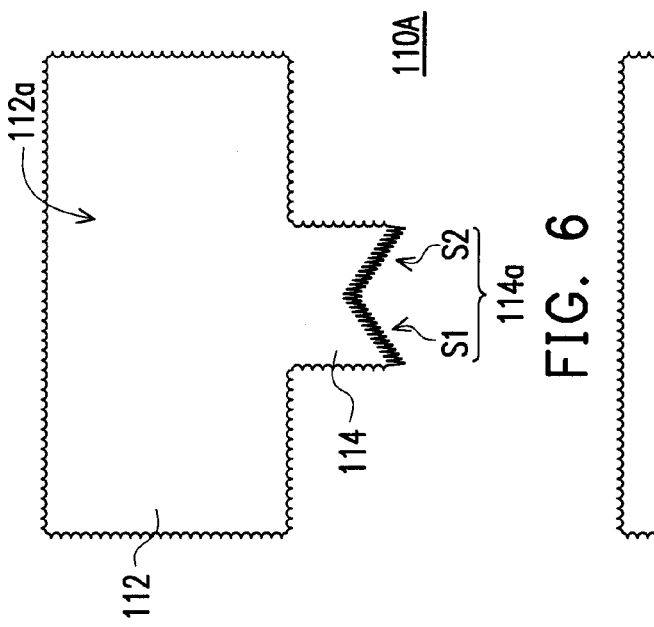
FIG. 7 illustrates a LGP according to still another embodiment of the invention.

FIG. 7 illustrates a LGP according to still another embodiment of the invention. With reference to FIG. 7, in the LGP 110B, the light-incident surface 114a is a first arc surface. The first arc surface may be concave inward the main body 112. That is, in the LGP 110B, the light-incident surface 114a may be an arc-shaped groove that is concave inward the main body 112.

Figure 8:
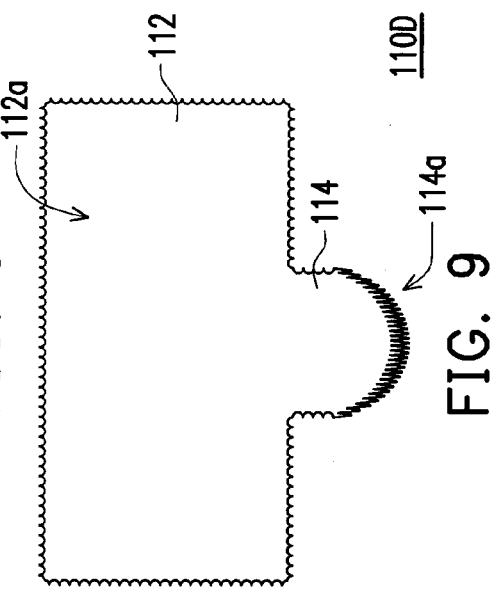
FIG. 8 illustrates a LGP according to still another embodiment of the invention.
Figure 9:
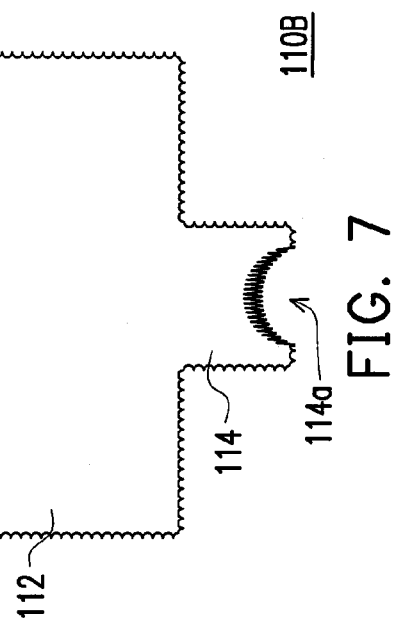
FIG. 9 illustrates a LGP according to an embodiment of the invention.

FIG. 8 illustrates a LGP according to still another embodiment of the invention. With reference to FIG. 8, in the LGP 110C, the light-incident surface 114a protrudes in a direction outward the main body 112. Specifically, in the LGP 110C, the light-incident surface 114a includes a third surface S3 and a fourth surface S4 directly connected to the third surface S3. The third surface S3 and the fourth surface S4 are perpendicular to the light-emitting surface 112a. The third surface S3 and the fourth surface S4 form a V-shaped protrusion that protrudes in the direction outward the main body 112. FIG. 9 illustrates a LGP according to an embodiment of the invention. With reference to FIG. 9, in the LGP 110D, the light-incident surface 114a is a second arc surface that protrudes in the direction outward the main body 112.

FIG. 10 illustrates a LGP according to another embodiment of the invention. With reference to FIG. 10, the LGP 110E is similar to the LGP 110 shown in FIG. 4, whereas the light-incident protrusion part 114 in the LGP 110E further has a first inclined surface P1 and a second inclined surface P2. The first inclined surface P1 is tilted in a direction against the inside of the light-incident protrusion part 114, a tilt direction of the second inclined surface P2 is opposite to a tilt direction of the first inclined surface P1. The first inclined surface P1 and the second inclined surface P2 connect the first peripheral surface 114c and the second peripheral surface 112b. Besides, the first inclined surface P1 and the second inclined surface P2 may both have a plurality of second optical microstructures 114d.

FIG. 11 illustrates a LGP according to still another embodiment of the invention. With reference to FIG. 11, the LGP 110F is similar to the LGP 110E shown in FIG. 10, whereas the light-incident protrusion part 114 in the LGP 110F further has a third inclined surface P3 parallel to the first inclined surface P1 and a fourth inclined surface P4 parallel to the second inclined surface P2. The third inclined surface P3 connects the first peripheral surface 114c and the light-incident surface 114a, and the fourth inclined surface P4 connects the first peripheral surface 114c and the light-incident surface 114a. Besides, the third inclined surface P3 and the fourth inclined surface P4 may both have a plurality of second optical microstructures 114d.

FIG. 12 illustrates a LGP according to still another embodiment of the invention. With reference to FIG. 12, the LGP 110G is similar to the LGP 110 shown in FIG. 4, whereas the light-incident protrusion part 114 in the LGP 110G further has a third arc surface C3 and a fourth arc surface C4. An arc opening of the third arc surface C3 and an arc opening of the fourth arc surface C4 face a direction outward the main body 112. The third arc surface C3 connects the second peripheral surface 112b and the first peripheral surface 114c, and the fourth arc surface C4 connects the second peripheral surface 112b and the first peripheral surface 114c. Besides, the third arc surface C3 and the fourth arc surface C4 may both have a plurality of second optical microstructures 114d.

Figure 13:
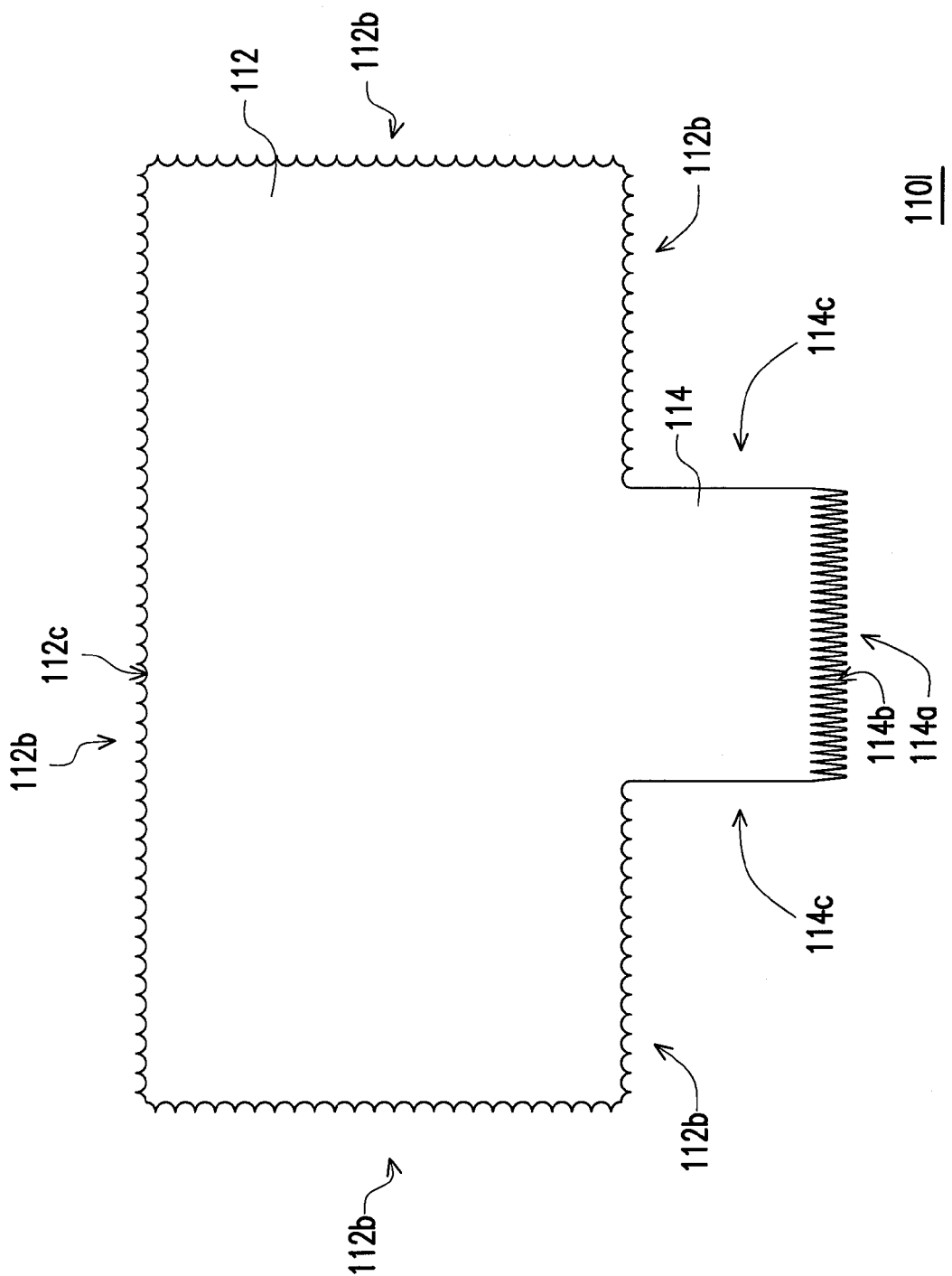
FIG. 13 illustrates a LGP according to an embodiment of the invention.

FIG. 13 illustrates a LGP according to an embodiment of the invention. With reference to FIG. 4 and FIG. 13, the LGP 110I shown in FIG. 13 is similar to the LGP 110 shown in FIG. 4, and therefore the same components are labeled by the same reference numbers. The difference between the LGP 110I and the LGP 110 lies in that the first peripheral surface 114c of the LGP 110I may alternatively not have the second optical microstructures 114d.

Figure 14:
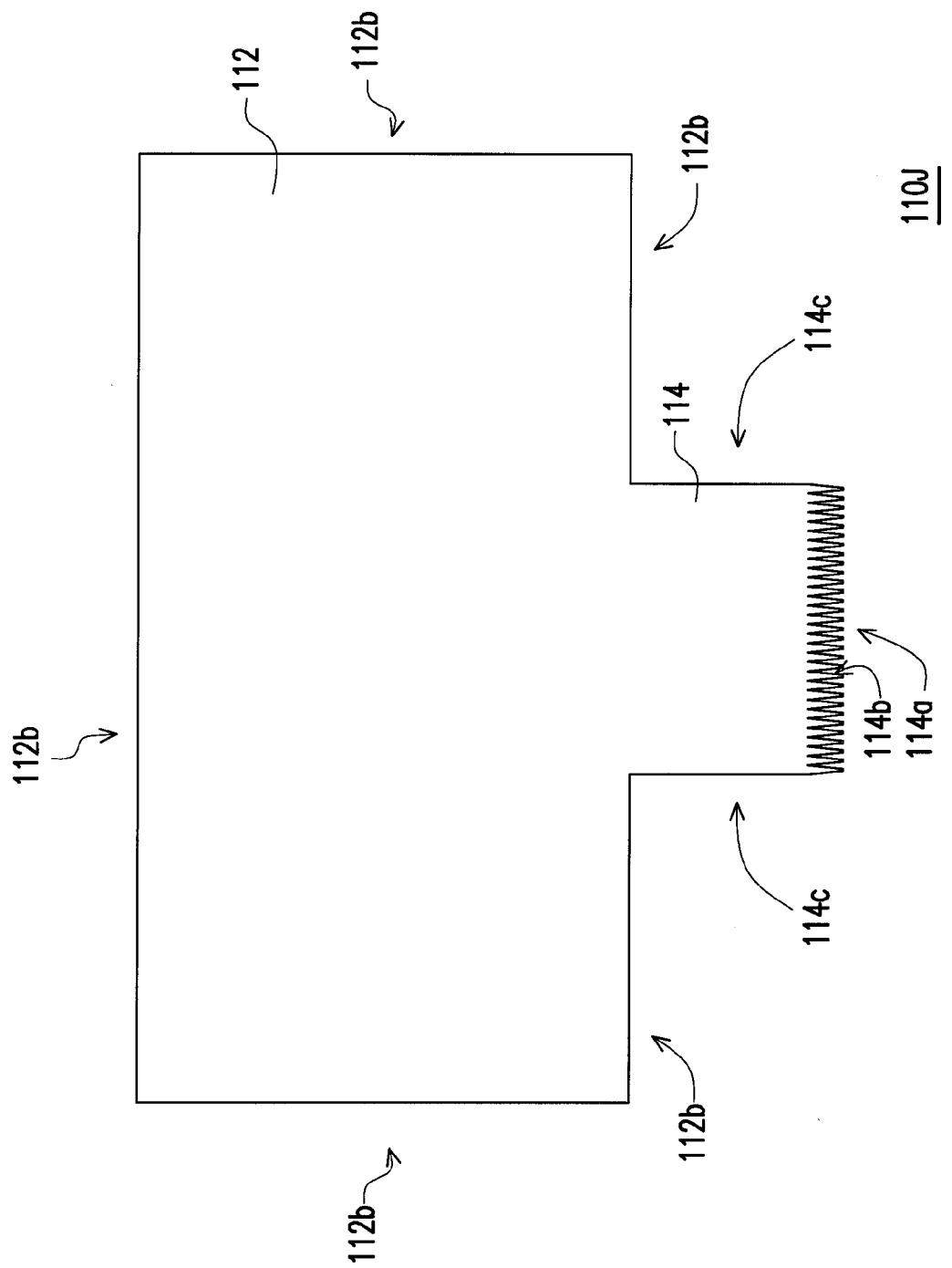
FIG. 14 illustrates a LGP according to another embodiment of the invention.

FIG. 14 illustrates a LGP according to another embodiment of the invention. With reference to FIG. 4 and FIG. 14, the LGP 110J shown in FIG. 14 is similar to the LGP 110 shown in FIG. 4, and therefore the same components are labeled by the same reference numbers. The difference between the LGP 110J and the LGP 110 lies in that the second peripheral surface 112b and the first peripheral surface 114c of the LGP 110J may alternatively not have the third optical microstructures 112c and the second optical micro structures 114d.

Figure 15:
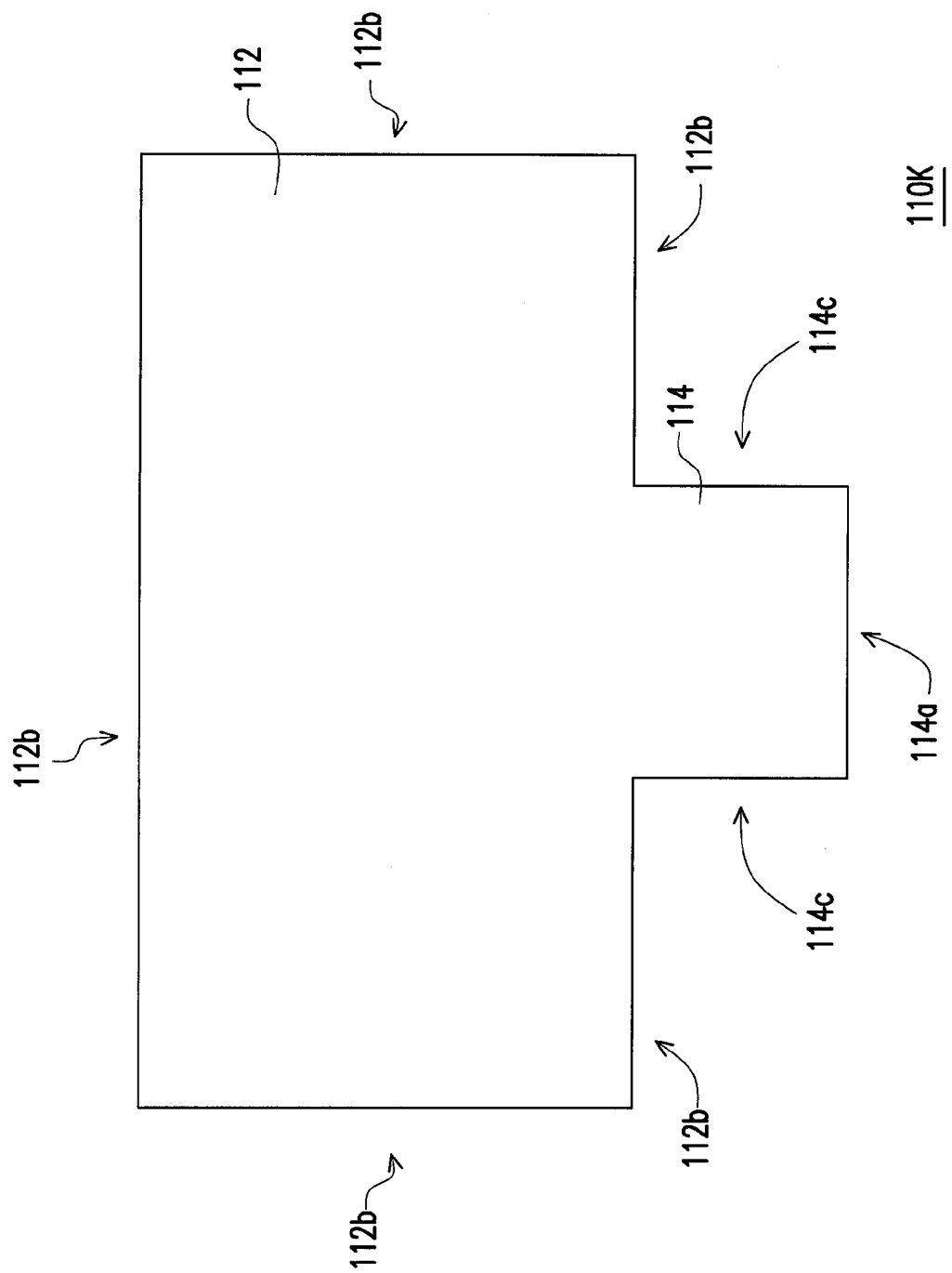
FIG. 15 illustrates a LGP according to still another embodiment of the invention.

FIG. 15 illustrates a LGP according to still another embodiment of the invention. With reference to FIG. 4 and FIG. 15, the LGP 110K shown in FIG. 15 is similar to the LGP 110 shown in FIG. 4, and therefore the same components are labeled by the same reference numbers. The difference between the LGP 110K and the LGP 110 lies in that the second peripheral surface 112b, the first peripheral surface 114c, and the light-incident surface 114a of the LGP 110K may alternatively not have the third optical microstructures 112c, the second optical microstructures 114d, and the first optical microstructures 114b.

With reference to FIG. 1, FIG. 2, and FIG. 3, the display device 100 described herein may further include a base 170. As shown in FIG. 3, the base 170 serves to hole the LGP 110, the side frame 130, and the display panel 140. The light-incident protrusion part 114 is located between the base 170 and the main body 112. The display device 100 that includes the base 170 may be applied as a desktop display. In the embodiment, the display device 100 further includes a first connection element 180. The first connection element 180 connects the side frame 130 and the base 170 and covers the light-incident protrusion part 114 and the illuminating element 120.

As shown in FIG. 2 and FIG. 3, the display device 100 described in the embodiment further includes a first driving circuit board 190 electrically connected to the illuminating element 120. The first driving circuit board 190 acts to drive the illuminating element 120. In the embodiment, the first driving circuit board 190 may be located in the base 170. However, the invention is not limited to the above descriptions. In another embodiment of the invention, the first driving circuit board 190 may also be located between the first connection element 180 and the rear plate 150. That is, the first driving circuit board 190 described in the embodiment may not be located on the rear plate 150, which allows the thickness D of the display device 100 to be reduced to a great extent. Thereby, the display device 100 may be miniaturized.

Figure 16:
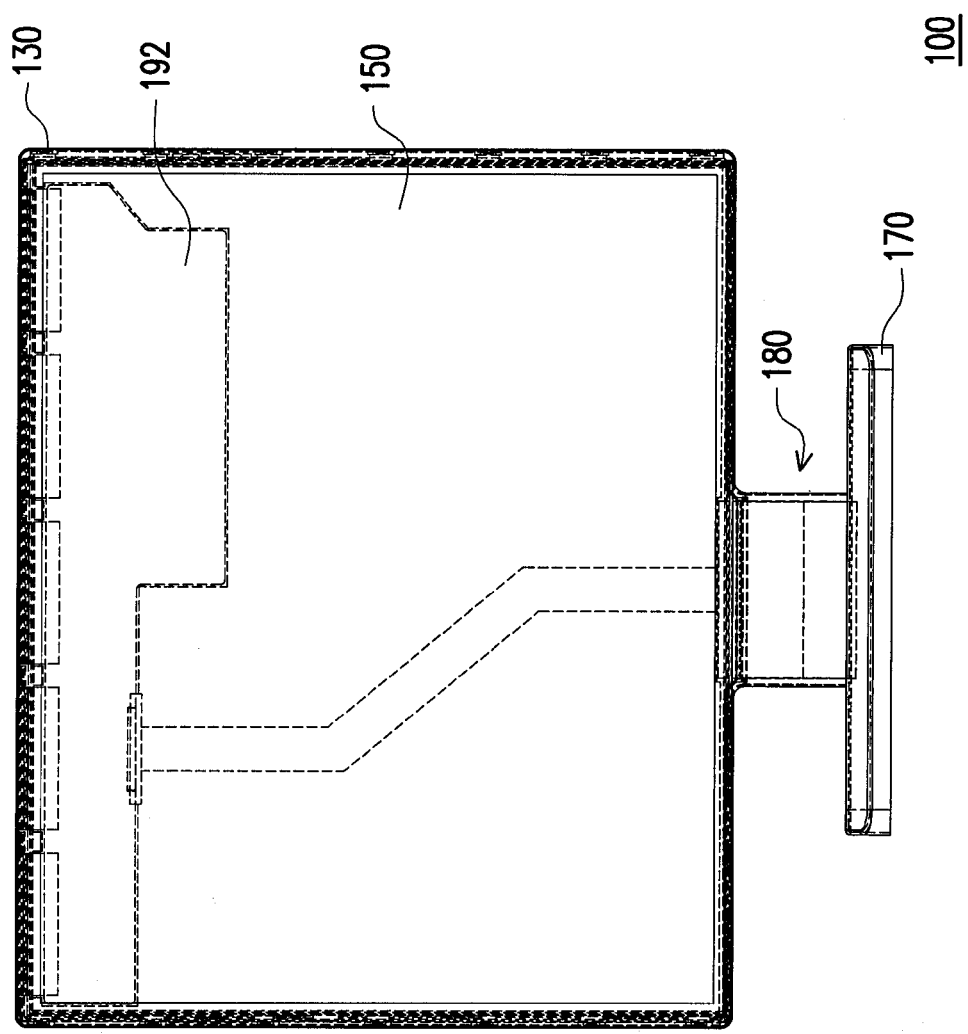
FIG. 16 illustrates a rear side of the display device shown in FIG. 1.

FIG. 16 illustrates a rear side of the display device shown in FIG. 1. With reference to FIG. 16, the display device 100 described in the embodiment further includes a second driving circuit board 192 electrically connected to the display panel 140. The second driving circuit board 192 acts to drive the display panel 140. In the embodiment, the LGP 110 may be located between the second driving circuit board 192 and the display panel 140. That is, the second driving circuit board 192 may be located on the rear plate 150. However, the invention is not limited to the above descriptions. In another embodiment of the invention, the second driving circuit board 192 may also be located in the base 170 or between the first connection element 180 and the rear plate 150, so as to further reduce the thickness D of the display device 100.

Second Embodiment

Figure 17:
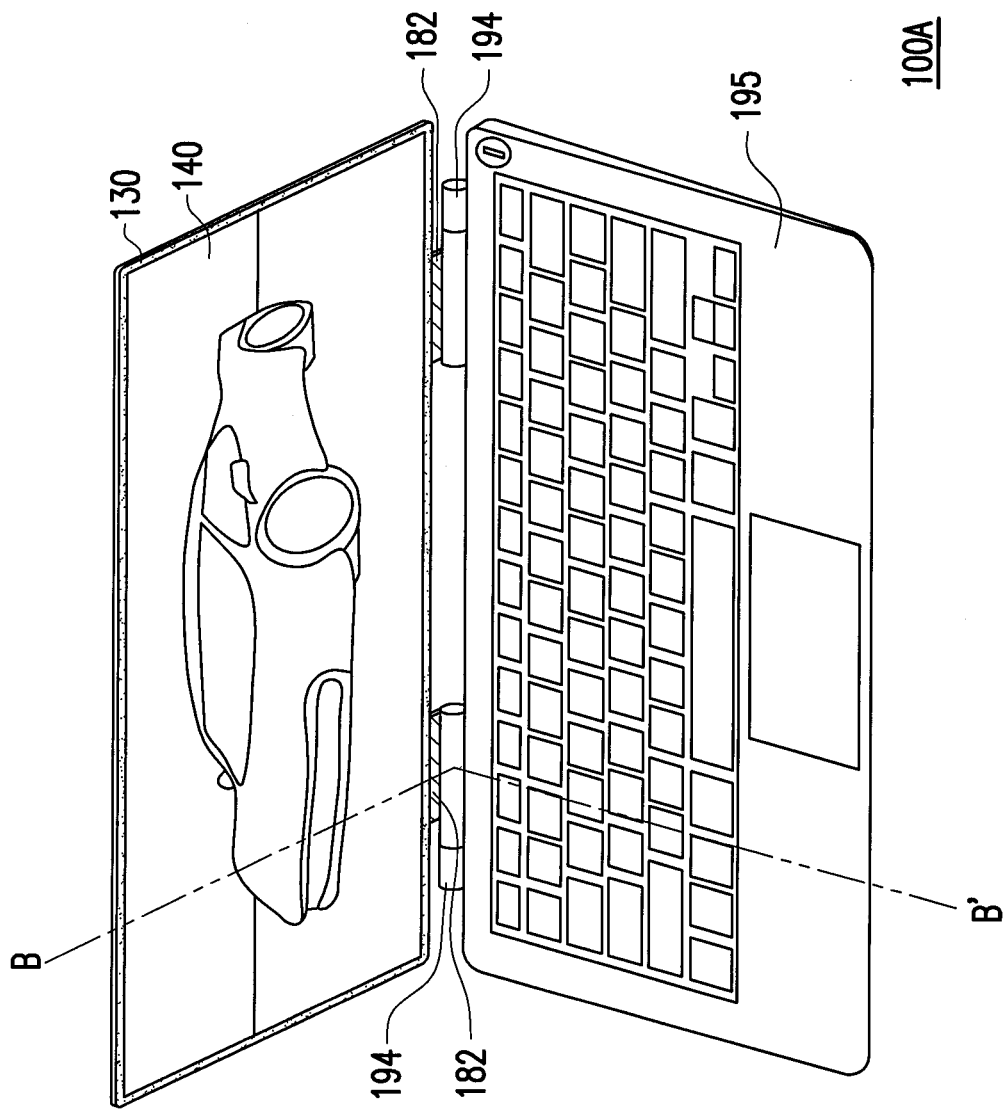
FIG. 17 is a schematic three-dimensional view of a display device according to a second embodiment of the invention.
Figure 18:
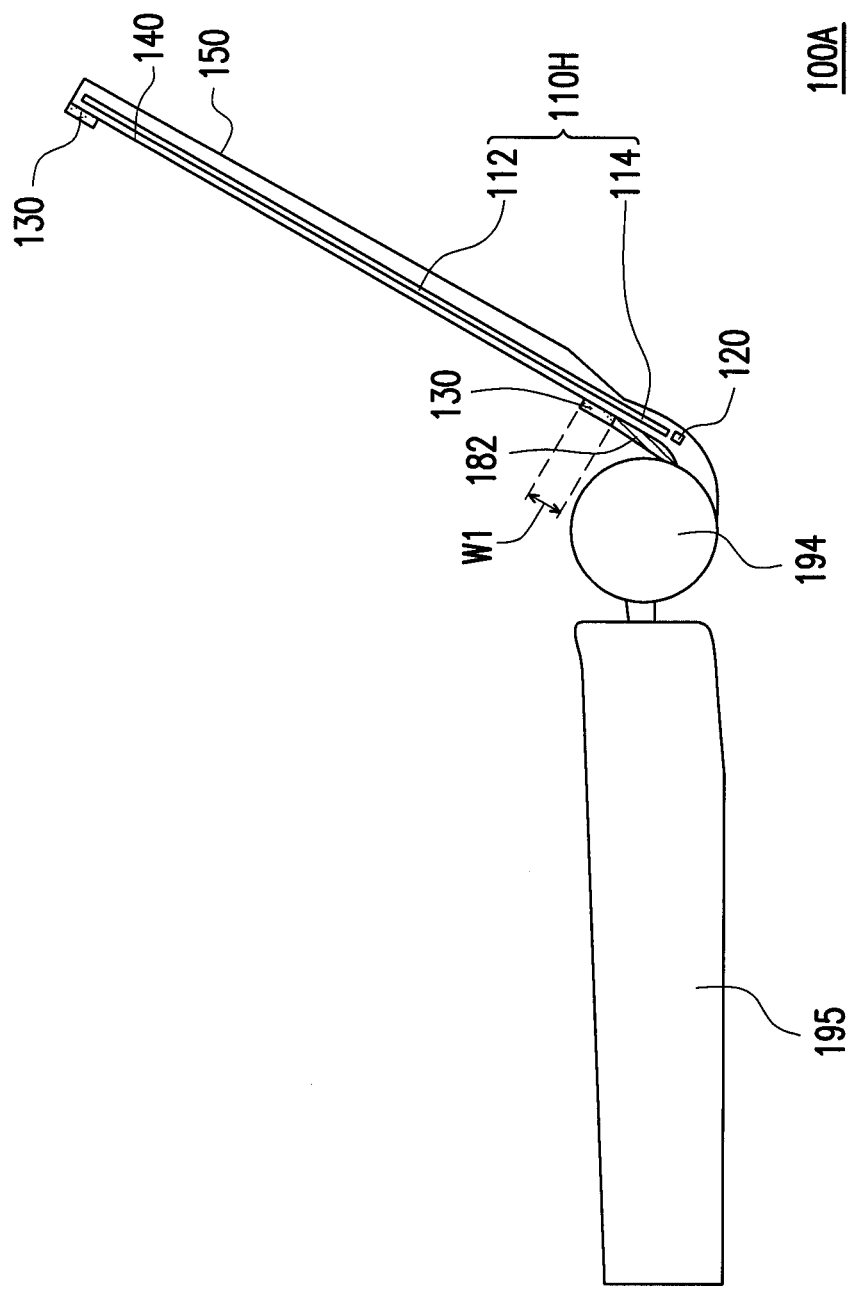
FIG. 18 is a cross-sectional view taken along a section line B-B' shown in FIG. 17.
Figure 19:
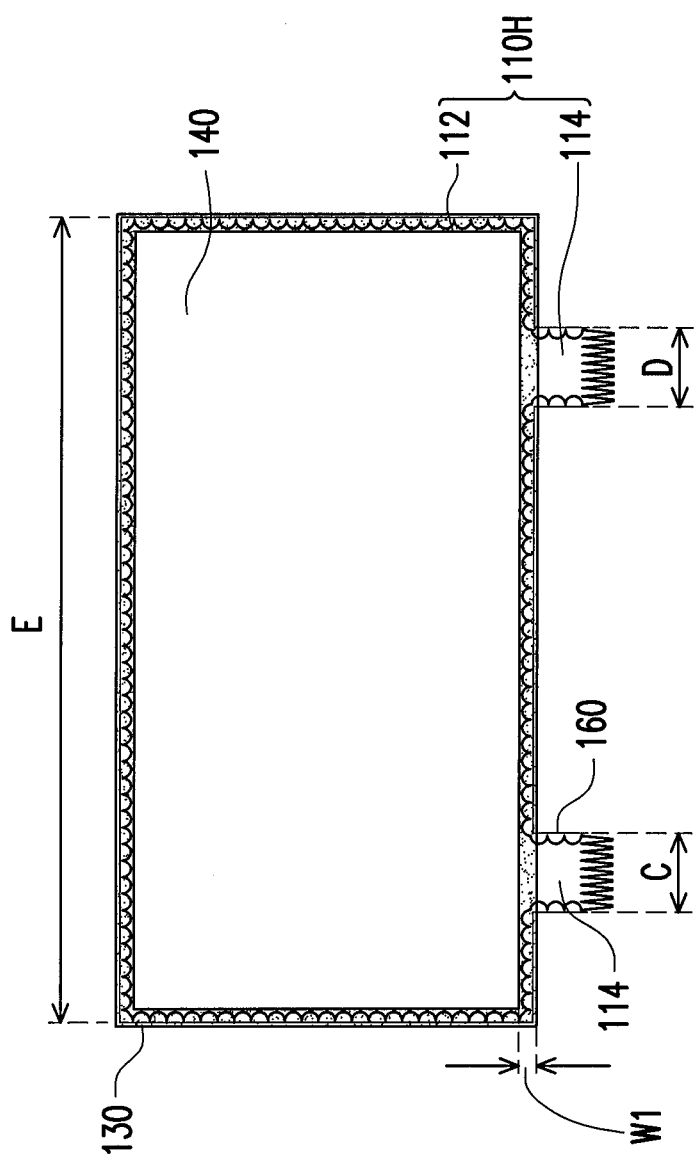
FIG. 19 illustrates the LGP, the display panel, and the side frame shown in FIG. 18.

FIG. 17 is a schematic three-dimensional view of a display device according to a second embodiment of the invention. FIG. 18 is a cross-sectional view taken along a section line B-B' shown in FIG. 17. FIG. 19 illustrates the LGP, the display panel, and the side frame shown in FIG. 18. The display device 100A described in the embodiment is similar to the display device 100 described in the first embodiment, and therefore the same components are labeled by the same reference numbers. The difference therebetween lies in that the LGP 110H described herein includes two light-incident protrusion parts 114 (shown in FIG. 19). The display device 100A described in the embodiment further includes a rotation axis 194, a host module 195, and a second connection element 182 (shown in FIG. 17 and FIG. 18). The difference is described below, while the similarity will not be further explained.

With reference to FIG. 19, the LGP 110H described herein includes a main body 112 and the two light-incident protrusion parts 114. Widths of the two light-incident protrusion parts 114 are C and D, and a width of the main body 112 is E. In the embodiment, C, D, and E satisfy the following equation (3).

$$(C+D) \leq \frac{4}{5}E \tag{3}$$

As shown in FIG. 18, the two light-incident protrusion parts 114 are exposed by the side frame 130 and the display panel 140. That is, the light-incident protrusion parts 114 are located outside the side frame 130. The light beam (not shown) emitted by each illuminating element 120 may be mixed within the light-incident protrusion parts 114 outside the side frame 130, and the mixed light beam then enters the main body 112, so as to prevent the light beam entering the main body 112 from being non-uniformly distributed. Since the light beam undergoes the light-mixing process within the light-incident protrusion parts 114 outside the side frame 130, the side frame 130 described herein need not cover the light-mixing area (where the light-incident protrusion parts 114 are located). Thereby, the width W1 of the side frame 130 may be reduced, and thus the display device 100A described herein may be equipped with the side frame having the small width.

In this embodiment, the light-incident protrusion parts 114 are made of a flexible material, for instance. Thereby, the light-incident protrusion parts 114 may be bent corresponding to the shape of the display device 100A, such that the shape of the display device 100A may be designed in a more flexible manner. For instance, the light-incident protrusion parts 114 may be a bundle of optical fibers. However, the invention is not limited thereto, and the light-incident protrusion parts 114 and the main body 112 in other exemplary embodiments may be made of a rigid material. Besides, the light-incident protrusion parts 114 and the main body 112 may be made of the same material.

With reference to FIG. 17 and FIG. 18, the display device 100A described in the embodiment further includes the at least one rotation axis 194, the host module 195 connected to the rotation axis 194, and the second connection element 182 pivoted to the rotation axis 194. The second connection element 182 connects the side frame 130 and the rotation axis 194 and covers the light-incident protrusion parts 114 and the illuminating element 120. In addition, as to the input signals and the power supply of the display device 100A, signals may be input to the display device 100A by means of a USB interface, through Bluetooth connection, or in an infrared manner, and power may be supplied to the display device 100A by means of a USB interface, through Bluetooth connection, or in an infrared manner as well. Thereby, the thickness of the display device 100A will not be affected by the configurations of the input signal end and the power supply end. Moreover, the display device 100A described in the embodiment may have similar functions and advantages to those of the display device 100 described in the first embodiment and thus will not be further explained.

Figure 20:
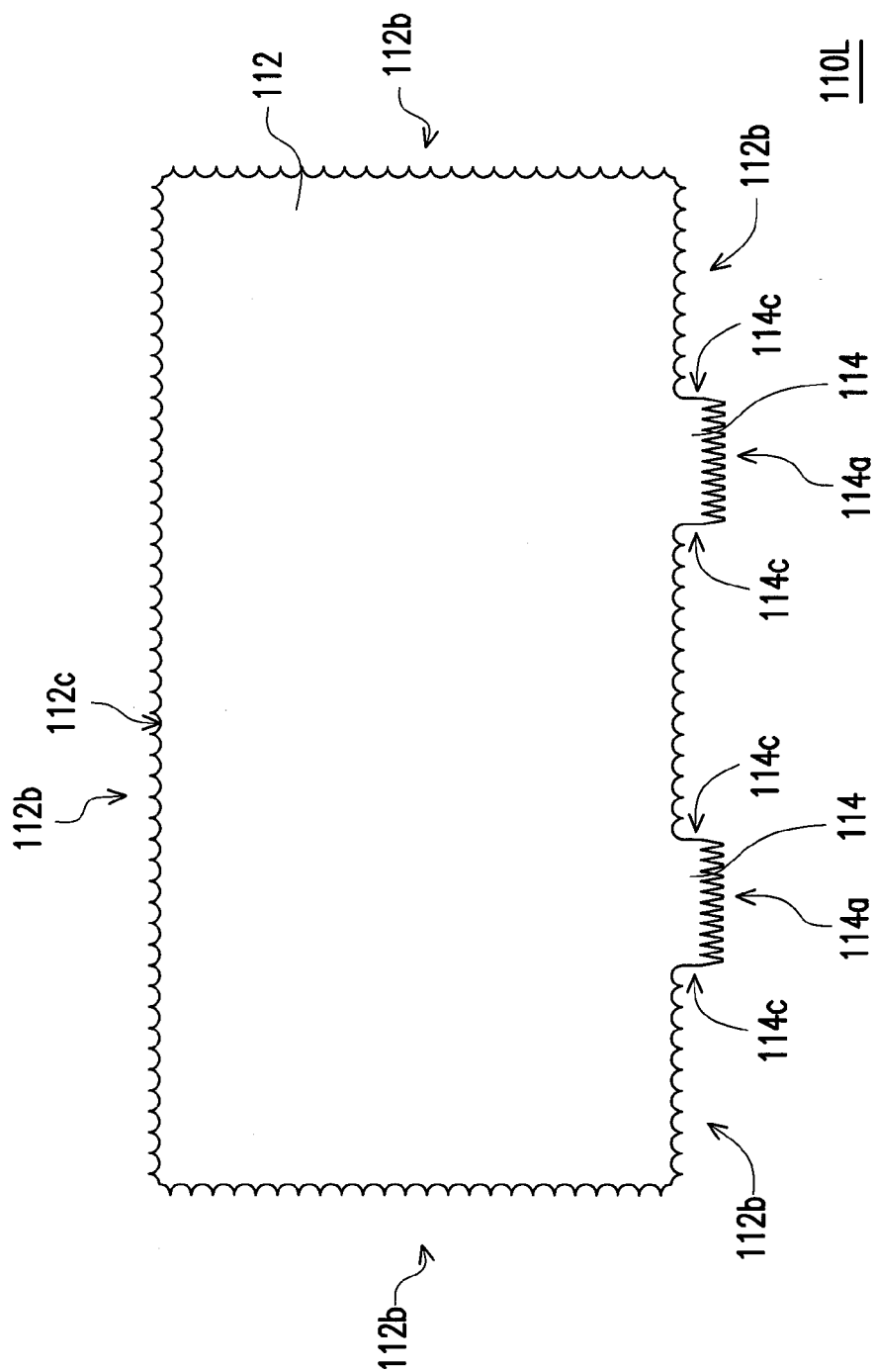
FIG. 20 illustrates a LGP according to an embodiment of the invention.

FIG. 20 illustrates a LGP according to an embodiment of the invention. With reference to FIG. 19 and FIG. 20, the LGP 110L shown in FIG. 20 is similar to the LGP 110H shown in FIG. 19, and therefore the same components are labeled by the same reference numbers. The difference between the LGP 110L and the LGP 110H lies in that the first peripheral surface 114c of the LGP 110L may alternatively not have the optical microstructures.

Figure 21:
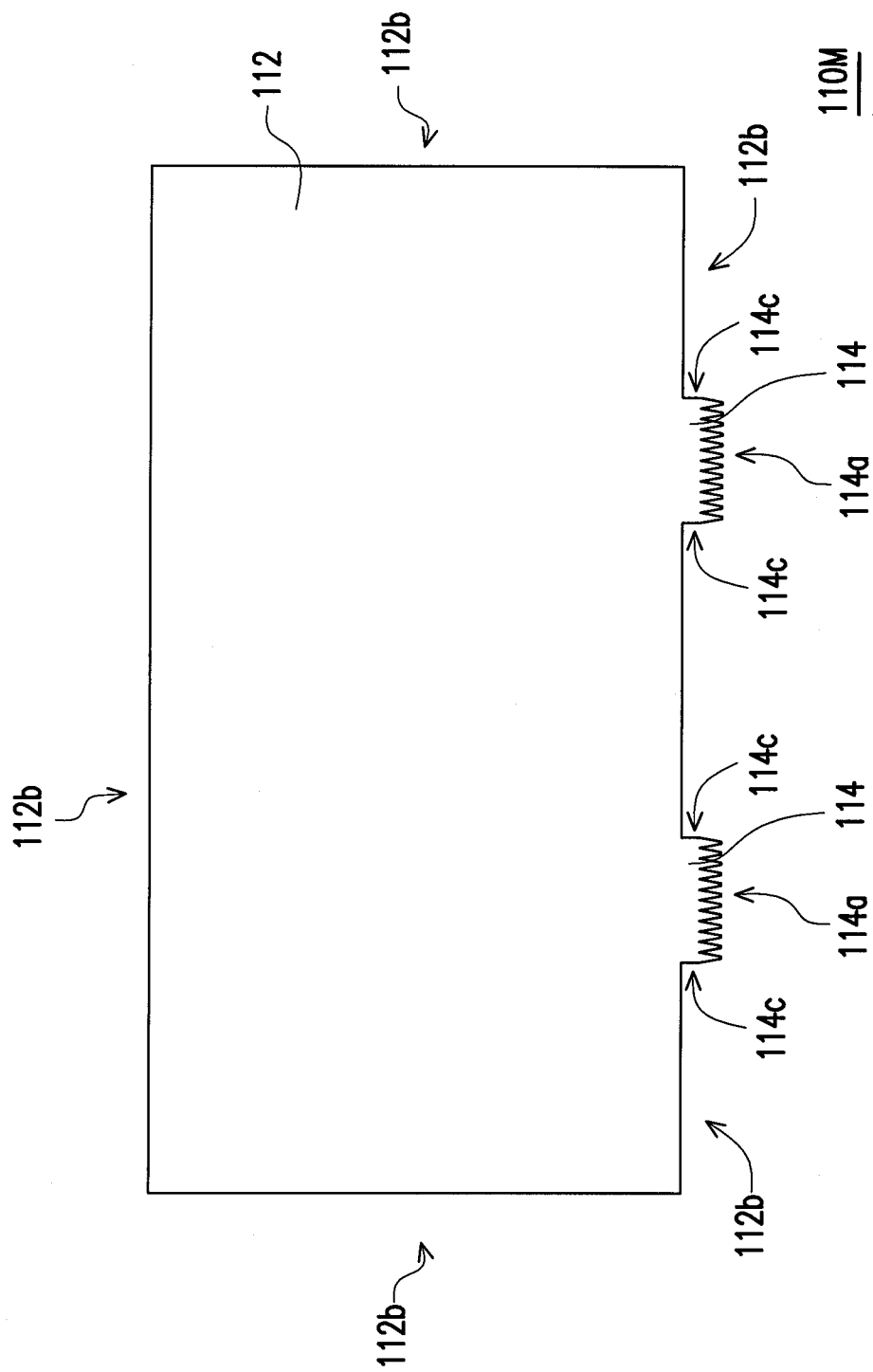
FIG. 21 illustrates a LGP according to another embodiment of the invention.

FIG. 21 illustrates a LGP according to another embodiment of the invention. With reference to FIG. 19 and FIG. 21, the LGP 110M shown in FIG. 21 is similar to the LGP 110H shown in FIG. 19, and therefore the same components are labeled by the same reference numbers. The difference between the LGP 110M and the LGP 110H lies in that the second peripheral surface 112b and the first peripheral surface 114c of the LGP 110M may alternatively not have the optical microstructures.

Figure 22:
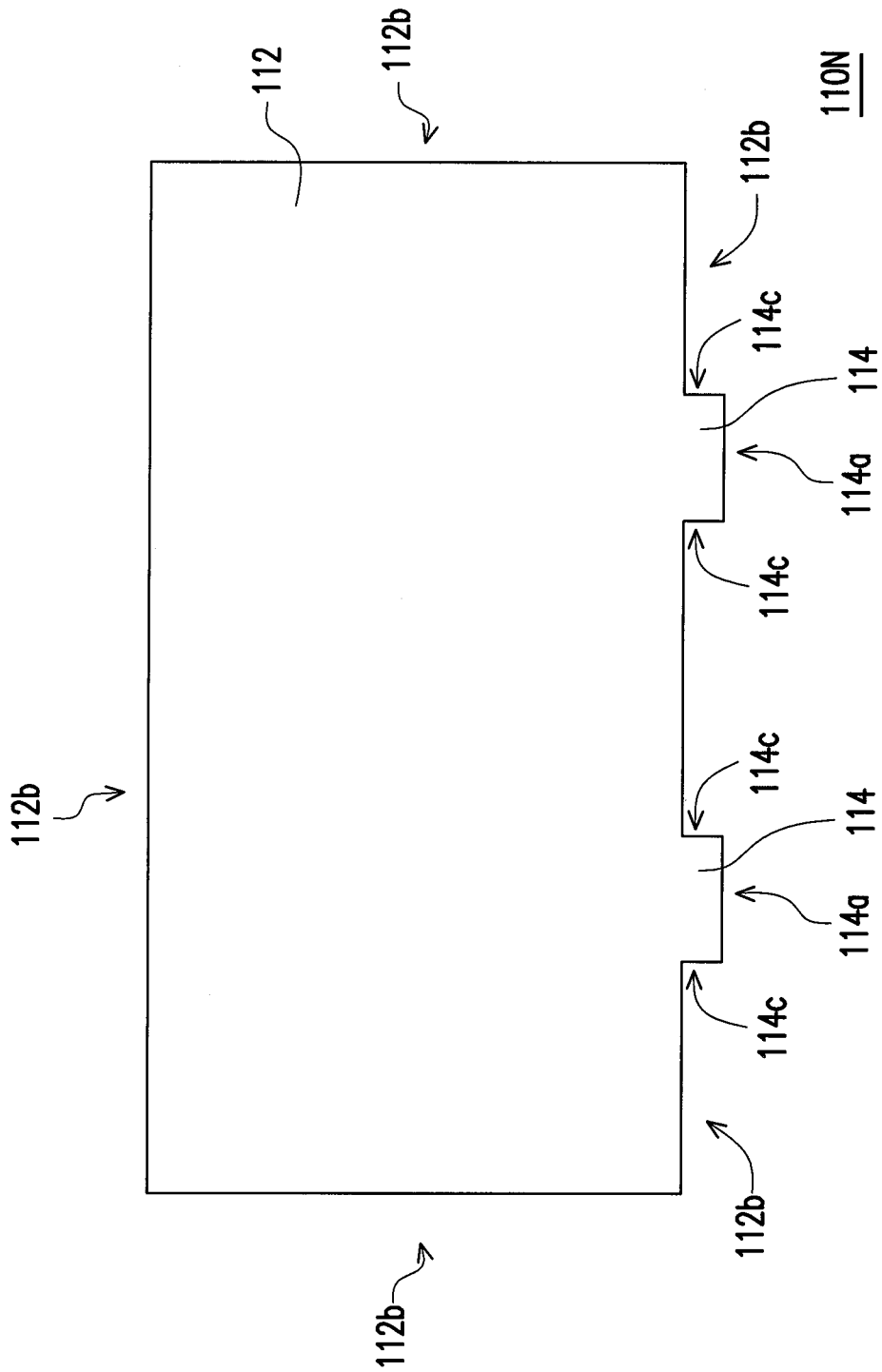
FIG. 22 illustrates a LGP according to still another embodiment of the invention.

FIG. 22 illustrates a LGP according to still another embodiment of the invention. With reference to FIG. 19 and FIG. 22, the LGP 110N shown in FIG. 22 is similar to the LGP 110H shown in FIG. 19, and therefore the same components are labeled by the same reference numbers. The difference between the LGP 110N and the LGP 110H lies in that the second peripheral surface 112b, the first peripheral surface 114c, and the light-incident surface 114a of the LGP 110N may alternatively not have the optical microstructures.

To sum up, the display device described in the embodiments of the invention may have at least one of the following advantages or effects. According to an embodiment of the invention, the light beam emitted from the illuminating element may undergo a light-mixing process within the light-incident protrusion part outside the side frame, and thus the side frame need not cover the light-mixing area (where the light-incident protrusion part is located) that is apt to encounter the issue of uneven light distribution. Thereby, the width of the side frame may be reduced, and thus the display device described herein may be equipped with the side frame having the small width.

In addition, at least one of the driving circuit board for driving the illuminating element and the driving circuit board for driving the display panel may be located on the base or behind the connection element. Unlike the conventional driving circuit board, the at least one driving circuit board described herein is not required to be arranged on the rear plate, such that the display device described herein may be miniaturized.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The exemplary embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A display device comprising:
   a light guide plate comprising:
      a main body having a light-emitting surface; and
      at least one light-incident protrusion part connected to the main body, the at least one light-incident protrusion part having a light-incident surface;
   at least one illuminating element arranged along the light-incident surface, the at least one illuminating element being capable of emitting a light beam, the light beam entering the light guide plate from the light-incident surface and leaving the light guide plate from the light-emitting surface;
   a side frame located on the light guide plate; and
   a display panel located between the light guide plate and the side frame and having a display side opposite to the light guide plate, wherein the side frame and the display panel expose the at least one light-incident protrusion part as viewed toward the display side.

2. The display device as recited in claim 1, further comprising a base holding the light guide plate, the side frame, and the display panel, the at least one light-incident protrusion part being located between the base and the main body.

3. The display device as recited in claim 2, further comprising a first connection element connecting the side frame and the base and covering the at least one light-incident protrusion part.

4. The display device as recited in claim 2, further comprising a first driving circuit board electrically connected to the at least one illuminating element, the first driving circuit board being located in the base.

5. The display device as recited in claim 1, further comprising at least one rotation axis, a host module connected to the at least one rotation axis, and a second connection element pivoted to the at least one rotation axis, wherein the second connection element connects the side frame and the at least one rotation axis and covers the at least one light-incident protrusion part and the at least one illuminating element.

6. The display device as recited in claim 1, wherein a material of the at least one light-incident protrusion part is a flexible material.

7. The display device as recited in claim 6, wherein the at least one light-incident protrusion part is a bundle of optical fibers.

8. The display device as recited in claim 1, wherein the light-incident surface has a plurality of first optical microstructures.

9. The display device as recited in claim 8, wherein the first optical microstructures are a plurality of V-shaped grooves connected with each other, and an extension direction of the V-shaped grooves is perpendicular to the light-emitting surface.

10. The display device as recited in claim 8, wherein the at least one light-incident protrusion part has a first peripheral surface connecting the light-incident surface and the main body and having a plurality of second optical microstructures.

11. The display device as recited in claim 10, wherein the second optical microstructures are a plurality of arc-shaped grooves connected with each other, and an extension direction of the arc-shaped grooves is perpendicular to the light-emitting surface.

12. The display device as recited in claim 1, wherein the main body has a second peripheral surface, and the second peripheral surface surrounds the light-emitting surface, connects with the light-emitting surface, and has a plurality of third optical microstructures.

13. The display device as recited in claim 12, wherein the third optical microstructures comprise a plurality of arc-shaped grooves connected with each other, and an extension direction of the arc-shaped grooves is perpendicular to the light-emitting surface.

14. The display device as recited in claim 1, further comprising a reflective sheet surrounding the light guide plate.

15. The display device as recited in claim 1, wherein a width of the main body is A, a width of the at least one light-incident protrusion part is B, and A and B satisfy:

$$B \le \frac{4}{5}A.$$

16. The display device as recited in claim 1, wherein the light-incident protrusion part are two in number, widths of the two light-incident protrusion parts are C and D, a width of the main body is E, and C, D, and E satisfy:

$$(C+D) \le \frac{4}{5}E.$$

17. The display device as recited in claim 1, wherein the light-incident surface is concave inward the main body.

18. The display device as recited in claim 17, wherein the light-incident surface comprises a first surface and a second surface directly connected to the first surface, the first surface and the second surface are perpendicular to the light-emitting surface, and the first surface and the second surface form a V-shaped groove concave inward the main body.

19. The display device as recited in claim 17, wherein the light-incident surface is a first arc surface concave inward the main body.

20. The display device as recited in claim 1, wherein the light-incident surface protrudes in a direction outward the main body.

21. The display device as recited in claim 20, wherein the light-incident surface comprises a third surface and a fourth surface directly connected to the third surface, the third surface and the fourth surface are perpendicular to the light-emitting surface, and the third surface and the fourth surface form a V-shaped protrusion protruding in the direction outward the main body.

22. The display device as recited in claim 20, wherein the light-incident surface is a second arc surface protruding in the direction outward the main body.

23. The display device as recited in claim 1, wherein the at least one light-incident protrusion part has a first peripheral surface connecting the light-incident surface and the main body, the main body has a second peripheral surface surrounding the light-emitting surface, and the first peripheral surface connects the second peripheral surface and the light-incident surface.

24. The display device as recited in claim 23, wherein the at least one light-incident protrusion part has a first inclined surface and a second inclined surface, the first inclined surface is tilted, a tilt direction of the second inclined surface is opposite to a tilt direction of the first inclined surface, and the first inclined surface and the second inclined surface connect the first peripheral surface and the second peripheral surface.

25. The display device as recited in claim 24, wherein the at least one light-incident protrusion part has a third inclined surface parallel to the first inclined surface and a fourth inclined surface parallel to the second inclined surface, and the third inclined surface connects the first peripheral surface and the light-incident surface, and the fourth inclined surface connects the first peripheral surface and the light-incident surface.

26. The display device as recited in claim 23, wherein the at least one light-incident protrusion part has a third arc surface and a fourth arc surface, and the third arc surface connects the second peripheral surface and the first peripheral surface, and the fourth arc surface connects the second peripheral surface and the first peripheral surface.

27. The display device as recited in claim 1, wherein the main body and the at least one light-incident protrusion part are substantially located on the same plane.

* * * * *